(12) United States Patent
Pham

(10) Patent No.: US 10,834,231 B2
(45) Date of Patent: Nov. 10, 2020

(54) METHODS, SYSTEMS, AND MEDIA FOR PAIRING DEVICES TO COMPLETE A TASK USING AN APPLICATION REQUEST

(71) Applicants: Synergex Group, Greenwich, CT (US); Wayne Taylor, Chandler, AZ (US); Pham Holdings, Inc., Lacey, WA (US)

(72) Inventor: Thien Van Pham, Lacey, WA (US)

(73) Assignees: Synergex Group, Greenwich, CT (US); Pham Holdings, Inc., Lacey, WA (US); Wayne Taylor, Chandler, AZ (US)

( * ) Notice: Subject to any disclaimer, the term of this patent is extended or adjusted under 35 U.S.C. 154(b) by 0 days.

(21) Appl. No.: 15/588,386

(22) Filed: May 5, 2017

(65) Prior Publication Data

US 2018/0103118 A1    Apr. 12, 2018

Related U.S. Application Data

(63) Continuation-in-part of application No. 15/291,023, filed on Oct. 11, 2016, now abandoned.

(51) Int. Cl.
*H04L 29/08* (2006.01)
*G06F 9/00* (2006.01)
*G06F 15/76* (2006.01)

(52) U.S. Cl.
CPC .............. *H04L 67/325* (2013.01); *G06F 9/00* (2013.01); *G06F 15/76* (2013.01); *H04L 67/141* (2013.01); *H04L 67/34* (2013.01)

(58) Field of Classification Search
CPC ....... H04L 67/325; H04L 67/141; G06F 9/00; G06F 15/76
See application file for complete search history.

(56) References Cited

U.S. PATENT DOCUMENTS

| | | | |
|---|---|---|---|
| 7,089,294 B1 * | 8/2006 | Baskey | H04L 47/10 709/203 |
| 7,676,585 B1 * | 3/2010 | Francke | H04L 67/306 709/229 |
| 8,103,308 B2 | 1/2012 | Jeffrey | |

(Continued)

OTHER PUBLICATIONS

International Search Report and Written Opinion dated Dec. 15, 2017 in International Patent Application No. PCT/US2017/55972.
(Continued)

*Primary Examiner* — Jerry B Dennison
(74) *Attorney, Agent, or Firm* — Byrne Poh LLP

(57) ABSTRACT

Methods, systems, and media for pairing devices for completing tasks are provided. In some embodiments, the method comprises: identifying, at a first user device, an indication of a task to be completed; transmitting, by the first user device to a server, information indicating the task to be completed and identifying information corresponding to the first user device; determining whether a predetermined duration of time has elapsed; in response to determining that the predetermined duration of time has elapsed, transmitting, from the first user device to the server, a request to determine whether the task has been completed by a second user device; and in response to receiving, from the server, an indication that the task has been completed by the second user device, retrieving data corresponding to the task from the server.

6 Claims, 4 Drawing Sheets

(56) References Cited

U.S. PATENT DOCUMENTS

| | | | |
|---|---|---|---|
| 8,250,137 B1* | 8/2012 | Nielsen | G06F 9/5044 709/203 |
| 8,472,874 B2 | 6/2013 | Tang et al. | |
| 8,583,090 B2 | 11/2013 | Vartiainen et al. | |
| 8,806,043 B1 | 8/2014 | Duraisamy et al. | |
| 8,879,994 B2 | 11/2014 | Brown et al. | |
| 9,047,117 B2 | 6/2015 | Horvitz et al. | |
| 9,699,243 B2* | 7/2017 | Hirshberg | H04L 67/06 |
| 9,734,000 B2* | 8/2017 | Mullins | G06F 9/485 |
| 2002/0019844 A1* | 2/2002 | Kurowski | H04L 67/42 709/201 |
| 2002/0023117 A1* | 2/2002 | Bernardin | G06F 9/465 718/104 |
| 2003/0225918 A1* | 12/2003 | Mayes | G06F 11/3476 719/310 |
| 2005/0007459 A1 | 1/2005 | Kawai et al. | |
| 2005/0081097 A1* | 4/2005 | Bacher | G06F 11/2023 714/13 |
| 2005/0198634 A1* | 9/2005 | Nielsen | G06F 9/5044 718/100 |
| 2006/0242278 A1* | 10/2006 | Hawkins | H04L 67/1095 709/221 |
| 2008/0215677 A1* | 9/2008 | Osias | H04L 67/142 709/203 |
| 2009/0319387 A1 | 12/2009 | Keithley et al. | |
| 2011/0154041 A1* | 6/2011 | Godfrey | H04W 12/0013 713/171 |
| 2011/0246502 A1* | 10/2011 | Aguera y Arcas | G06F 16/43 707/769 |
| 2011/0307902 A1* | 12/2011 | Nielsen | H01L 29/868 718/104 |
| 2012/0011511 A1* | 1/2012 | Horvitz | G06F 9/461 718/100 |
| 2012/0060163 A1* | 3/2012 | Khan | H04L 41/5074 718/103 |
| 2012/0254949 A1* | 10/2012 | Mikkonen | H04W 12/06 726/4 |
| 2013/0103775 A1* | 4/2013 | Chang | G06Q 20/327 709/206 |
| 2014/0074545 A1* | 3/2014 | Minder | G06Q 10/0633 705/7.27 |
| 2014/0087705 A1* | 3/2014 | Wooster | H04M 3/58 455/416 |
| 2014/0109184 A1* | 4/2014 | Parker, II | H04W 12/06 726/3 |
| 2014/0122729 A1* | 5/2014 | Hon | H04N 1/00127 709/228 |
| 2014/0143196 A1* | 5/2014 | White | G06F 9/4856 706/46 |
| 2014/0215595 A1* | 7/2014 | Prasad | G06F 21/41 726/8 |
| 2015/0026351 A1* | 1/2015 | Calman | H04L 65/1083 709/227 |
| 2015/0180849 A1* | 6/2015 | Nesic | H04L 63/0815 726/6 |
| 2015/0237111 A1* | 8/2015 | Hirshberg | G06F 9/54 715/748 |
| 2015/0281338 A1* | 10/2015 | Simhon | H04L 67/10 709/202 |
| 2016/0065626 A1* | 3/2016 | Jain | H04L 67/10 709/205 |
| 2016/0080475 A1* | 3/2016 | Singh | H04L 67/10 709/217 |
| 2016/0125490 A1* | 5/2016 | Angal | G06Q 30/06 705/26.35 |
| 2016/0128059 A1* | 5/2016 | Hsu | H04W 4/00 370/336 |
| 2016/0191499 A1* | 6/2016 | Momchilov | H04L 9/0822 713/171 |
| 2016/0308980 A1* | 10/2016 | Singh | H04M 1/72583 |
| 2016/0381032 A1* | 12/2016 | Hashmi | H04L 63/102 726/4 |
| 2017/0104849 A1* | 4/2017 | Mizuno | H04L 67/325 |
| 2017/0293767 A1* | 10/2017 | Barton | H04L 63/0428 |
| 2017/0359193 A1* | 12/2017 | Smith | H04L 12/2823 |
| 2017/0359314 A1* | 12/2017 | Mathias | H04L 67/06 |
| 2017/0364242 A1* | 12/2017 | Bhageria | G06F 16/9577 |
| 2018/0007099 A1* | 1/2018 | Ein-Gil | H04L 67/14 |
| 2018/0091621 A1* | 3/2018 | Kuo | H04L 67/2823 |
| 2018/0103118 A1* | 4/2018 | Pham | H04L 67/34 |
| 2018/0103119 A1* | 4/2018 | Pham | H04L 63/0876 |
| 2018/0131991 A1* | 5/2018 | Kanematsu | G06F 3/03545 |
| 2018/0332118 A1* | 11/2018 | Phipps | H04L 67/125 |
| 2019/0037611 A1* | 1/2019 | Renn | G06F 3/04883 |

OTHER PUBLICATIONS

Office Action dated Apr. 25, 2018 in U.S. Appl. No. 15/291,023.
Search Report dated May 8, 2020 in EP Patent Application No. 17859883.5, pp. 1-5.

* cited by examiner

METHODS, SYSTEMS, AND MEDIA FOR PAIRING DEVICES TO COMPLETE A TASK USING AN APPLICATION REQUEST

CROSS REFERENCE TO RELATED APPLICATION

This application is a continuation-in-part of U.S. patent application Ser. No. 15/291,023, filed Oct. 11, 2016, which is hereby incorporated by reference herein in its entirety.

TECHNICAL FIELD

The disclosed subject matter relates to methods, systems, and media for pairing devices to complete a task using an application request.

BACKGROUND

Users often want to complete tasks or perform actions such as taking a picture or signing a form on their user devices. Some tasks or actions may require particular hardware, such as a camera or touchpad that may not be available on the device the user is currently using (e.g., a desktop computer), and a different user device (e.g., a mobile phone) may be needed to complete the task or action. However, it can be difficult to pair two devices to complete the task or action.

Accordingly, it is desirable to provide new methods, systems, and media for pairing devices to complete a task using an application request.

SUMMARY

Methods, systems, and media for pairing devices to complete tasks are provided. In accordance with some embodiments of the disclosed subject matter, methods for pairing devices to complete tasks are provided, the methods comprising: identifying, at a first user device, an indication of a task to be completed; transmitting, by the first user device to a server, information indicating the task to be completed and identifying information corresponding to the first user device; determining whether a predetermined duration of time has elapsed; in response to determining that the predetermined duration of time has elapsed, transmitting, from the first user device to the server, a request to determine whether the task has been completed by a second user device; and in response to receiving, from the server, an indication that the task has been completed by the second user device, retrieving data corresponding to the task from the server.

In accordance with some embodiments of the disclosed subject matter, systems for pairing devices for completing tasks are provided, the systems comprising: a hardware processor that is programmed to identify, at a first user device, an indication of a task to be completed; transmit, by the first user device to a server, information indicating the task to be completed and identifying information corresponding to the first user device; determine whether a predetermined duration of time has elapsed; in response to determining that the predetermined duration of time has elapsed, transmit, from the first user device to the server, a request to determine whether the task has been completed by a second user device; and in response to receiving, from the server, an indication that the task has been completed by the second user device, retrieve data corresponding to the task from the server.

In accordance with some embodiments of the disclosed subject matter, non-transitory computer-readable media containing computer-executable instructions that, when executed by a processor, cause the processor to perform a method for pairing devices for completing tasks are provided, the method comprising: identifying, at a first user device, an indication of a task to be completed; transmitting, by the first user device to a server, information indicating the task to be completed and identifying information corresponding to the first user device; determining whether a predetermined duration of time has elapsed; in response to determining that the predetermined duration of time has elapsed, transmitting, from the first user device to the server, a request to determine whether the task has been completed by a second user device; and in response to receiving, from the server, an indication that the task has been completed by the second user device, retrieving data corresponding to the task from the server.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for pairing devices to complete a task using an application request are provided.

In some embodiments, the mechanisms described herein can allow a user to complete a task or action requested by an application executing on a first user device using a second user device. For example, in some embodiments, the task or action can include taking a photo or video using a camera associated with the second user device, receiving input via a touchscreen associated with the second user device, receiving audio data from a microphone associated with the second user device, and/or performing any other suitable task or action. In some embodiments, the mechanisms can cause the first user device to transmit an application task request to a database server that indicates the task or action to be performed by the second user device. The mechanisms can cause the second user device to query the database server to identify the pending application task request, and, in response to identifying the pending application task request, complete the task or action and upload any data collected while performing the task or action to the database server. The mechanisms can cause the first user device to periodically (e.g., every ten milliseconds, every one hundred milliseconds, and/or at any other suitable frequency) query the database server to determine if the task has been completed by the second user device, and, if the task has been completed, retrieve the data collected by the second user device.

Note that, in some embodiments, the first user device and the second user device can both be executing an application that requests the task or action. In some such embodiments, the application can be authenticated on both the first user device and the second user device with a user account associated with a user of the first user device and the second user device. In some embodiments, a username associated with the user account or any other suitable user identifying information can be used by the database server to store a received application task request from the first user device, identify pending application task requests for the second user device, and store data collected by the second user device in connection with the application task request.

Figure 1:
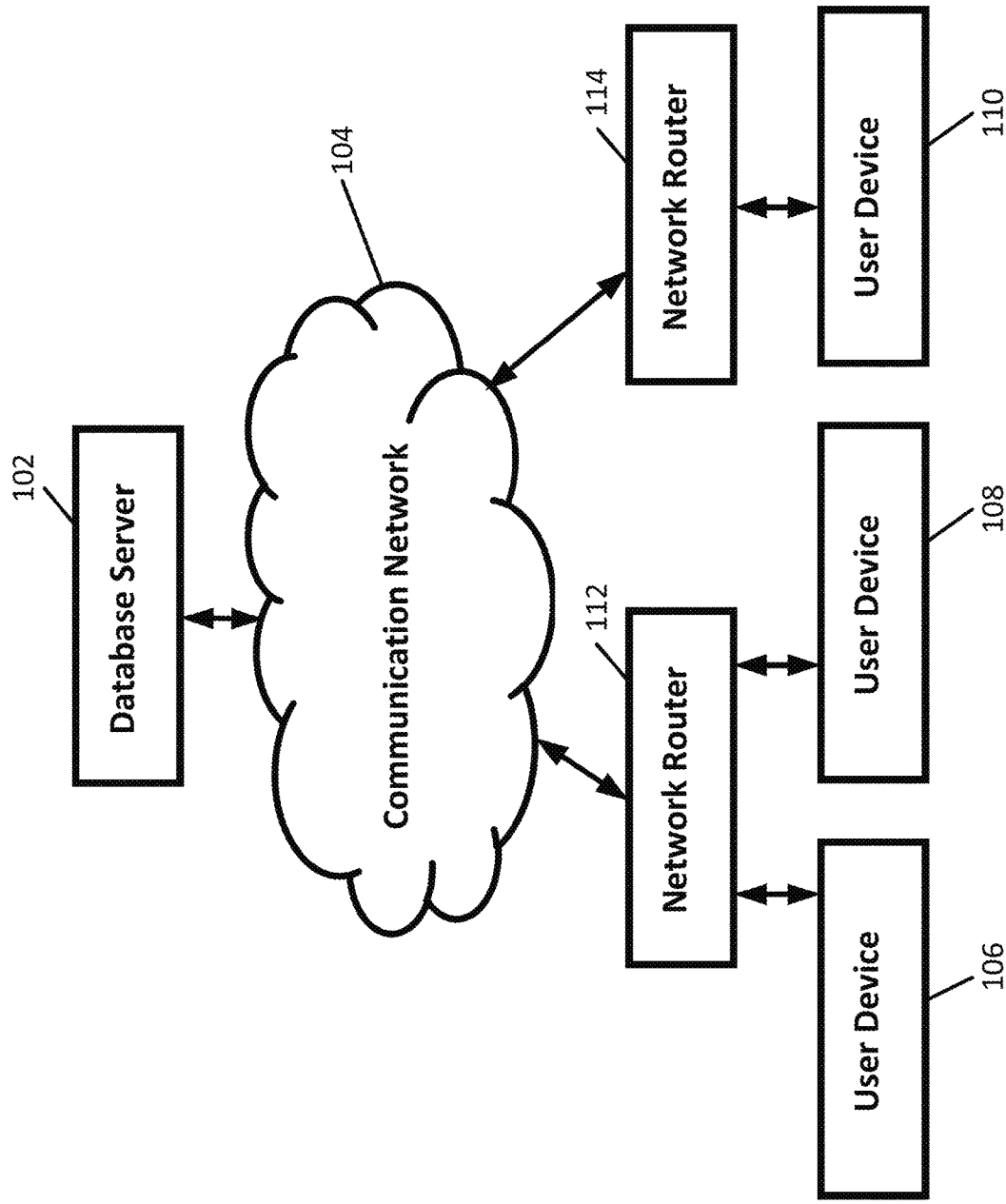
FIG. 1 shows a schematic diagram of an example of a system for pairing devices to complete tasks in accordance with some embodiments of the disclosed subject matter.

Turning to FIG. 1, an example 100 of hardware for pairing devices to complete tasks in accordance with some embodiments of the disclosed subject matter is shown. As illustrated, hardware 100 can include a database server 102, a communication network 104, user devices 106-110, and network routers 112 and 114.

Database server 102 can be any suitable server for storing information and/or data associated with an application (e.g., an application that executes on a mobile device, an application that executes on a laptop computer or a desktop computer, and/or any other suitable application). For example, in some embodiments, database server 102 can be a server that receives task requests from user device 106 and receives a query for pending task requests from user devices 108 and/or 110. As another example, in some embodiments, database server 102 can receive and store data associated with a completed task, such as a photo, a signature, and/or any other suitable data, as described below in connection with FIG. 4.

Communication network 104 can be any suitable combination of one or more wired and/or wireless networks in some embodiments. For example, communication network 104 can include any one or more of the Internet, a mobile data network, a satellite network, a local area network, a wide area network, a telephone network, a cable television network, a WiFi network, a WiMax network, and/or any other suitable communication network.

User devices 106, 108, and/or 110 can be any suitable user devices for executing applications, transmitting task requests, performing a requested task, and/or performing any other suitable functions. In some embodiments, user devices 106, 108, and/or 110 can include mobile devices (e.g., a mobile phone, a laptop computer, a wearable computer, and/or any other suitable mobile device) and/or non-mobile devices (e.g., a desktop computer, a smart television, and/or any other suitable non-mobile devices). In some embodiments, user devices 106, 108, and/or 110 can be local to each other or remote from each other. For example, as shown in FIG. 1, in some embodiments, user devices 106 and 108 can be local to each other and connected to communication network 104 through a network router 112. As another example, as shown in FIG. 1, in some embodiments, user device 110 can be connected to communication network 104 through a network router 114.

Although only one server 102 is shown in FIG. 1 to avoid over-complicating the figure, any suitable number of servers can be used in some embodiments.

Figure 2:
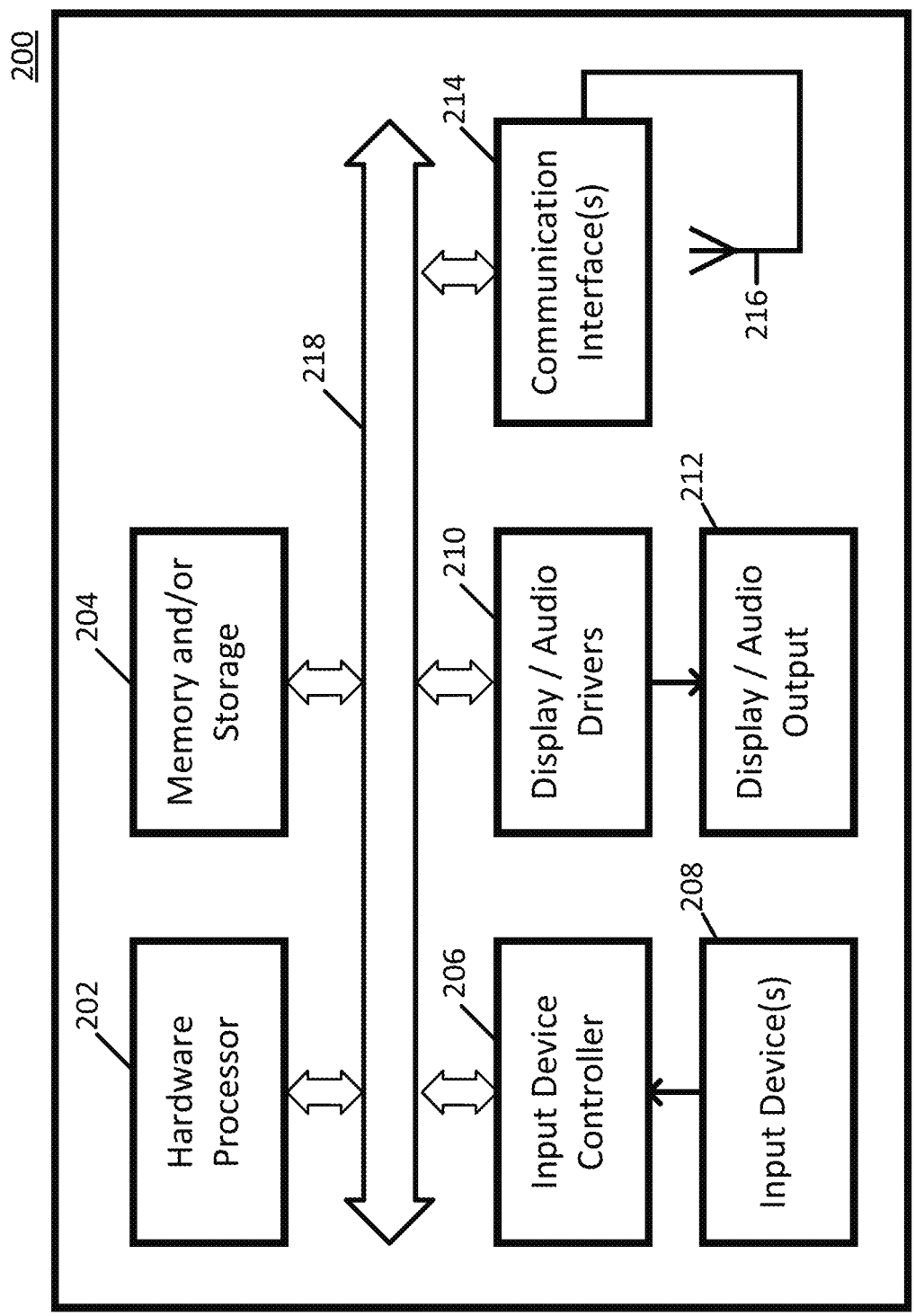
FIG. 2 shows an example of hardware that can be used in a server and/or a user device in accordance with some embodiments of the disclosed subject matter.

Database server 102 and user devices 106, 108, and 110 can be implemented using any suitable hardware in some embodiments. For example, in some embodiments, devices 102, 106, 108, and 110 can be implemented using any suitable general purpose computer or special purpose computer. For example, database server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from a device, such as input device 208, in some embodiments. For example, input device controller 206 can be circuitry for receiving input from an input device 208, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving an LCD display, a speaker, an LED, or any other type of output device.

Communication interface(s) 214 can be any suitable circuitry for interfacing with one or more communication networks, such as network 104 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can be included in hardware 200 in accordance with some embodiments.

Figure 3:
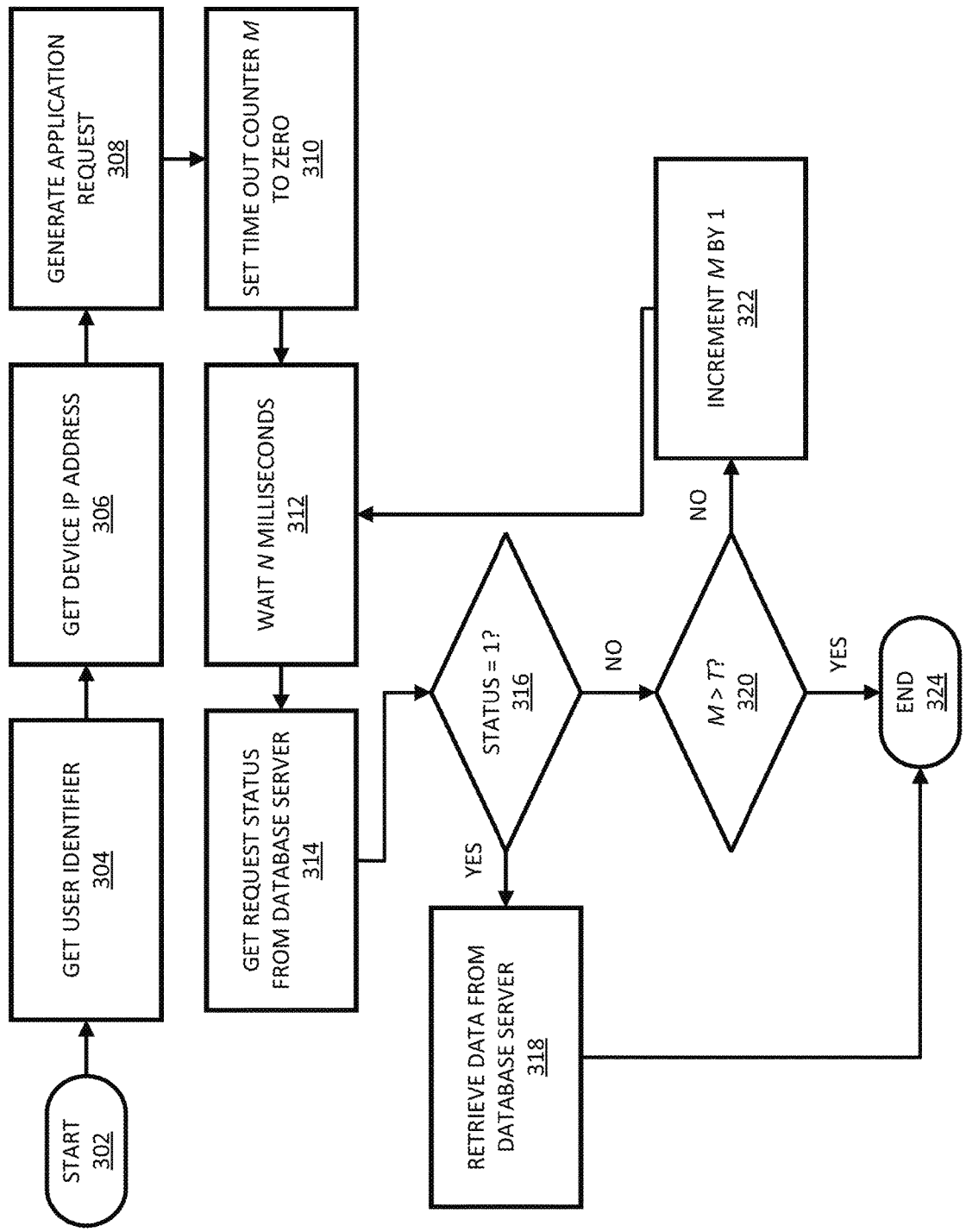
FIG. 3 shows an example of a process for generating a task request and retrieving task data in accordance with some embodiments of the disclosed subject matter.

Turning to FIG. 3, an example 300 of a process for generating a task request and retrieving data corresponding to the task request is shown in accordance with some embodiments of the disclosed subject matter. In some embodiments, blocks of process 300 can be performed by a first user device such as user device 106 as shown in and described above in connection with FIG. 1.

Process 300 can begin at 302. In some embodiments, process 300 can begin in response to determining that a user has opened a particular application on the first user device, selected a particular selectable input or user interface control on the first user device, and/or in response to any other suitable action(s). As a more particular example, in some embodiments, process 300 can begin in response to determining that a user of the first user device has selected a user interface control to upload a picture via an application or web browser executing on the first user device. Note that, in some embodiments, a user interface that requests permission from the user to proceed with process 300 may be presented. Additionally or alternatively, in some embodiments, the user interface may present instructions for opening a corresponding application on the second user device to execute process 400 of FIG. 4 (described below).

Process 300 can retrieve a user identifier at 304. For example, in some embodiments, process 300 can retrieve the user identifier from memory 204 of the first user device, as shown in and described above in connection with FIG. 2. In some embodiments, the user identifier can be any suitable identifier, such as a username associated with a user of the first user device, a username associated with a particular application executing on the first user device that was previously stored on the first user device, and/or any other suitable user identifier. Note that, in some embodiments, the user identifier can be a unique identifier other than a username, and can include any other suitable user identifying data, such as a personal identification number (PIN), biometric data, and/or any other suitable type of user identifier.

Process 300 can retrieve the Internet Protocol (IP) address associated with the first user device at 306. In some embodiments, the retrieved IP address can correspond to the IP address of the network router the first user device is connected to, such as network router 112 as shown in and described above in connection with FIG. 1.

At 308, process 300 can use the user identifier retrieved at block 304 and the IP address retrieved at block 306 to generate an application request. In some embodiments, the application request can include a request to perform any suitable task or action, such as using a camera of a second user device (e.g., user device 108 and/or user device 110) to take a picture, using a touchscreen of a second user device to receive a user signature, and/or any other suitable task or action. In some embodiments, the application request can include any suitable information, such as an identifier corresponding to the request, a current date and/or time, the IP address, the user identifier, a passcode, a request type, a request status, and/or any other suitable information. In some embodiments, process 300 can generate the passcode to be a unique and/or randomized alphanumeric string corresponding to the particular application request. In some embodiments, the request type can be set to be a value corresponding to a type of task or a type of application associated with the application request. For example, an application request corresponding to a task to capture an image using a device camera can have a first particular request type (e.g., "1," "C," "P," "Photo," and/or any other suitable request type), and an application request corresponding to a task to capture data from a touchscreen can have a different request type (e.g., "2," "T," "Touch," and/or any other suitable request type). In some embodiments, process 300 can set the request status to 0 at block 308. Note that, in some embodiments, the application request can additionally include information indicating a second user device (e.g., a particular mobile phone, a particular tablet computer, and/or any other suitable second user device) that is to be used to perform the task or action.

In some embodiments, process 300 can cause the first user device to wait for the task to be completed by a second user device for no more than a predetermined duration of time by setting a time out counter. In some such embodiments, process 300 can set a time out counter value M to 0 at block 310. In some embodiments, the time out counter can be omitted.

At 312, process 300 can wait N milliseconds. In some embodiments, N can be any suitable value (e.g., one, two, five, one hundred, one thousand, and/or any other suitable value).

Process 300 can query database server 102 (after process 300 has waited N milliseconds at block 312) to determine an updated request status at 314. For example, in some embodiments, the first user device can connect to database server 102 via a network router (e.g., network router 112) and communication network 104 to request an updated request status corresponding to the generated application request. Note that, in some embodiments, the request status may have been updated by a second user device that has completed the application request, as shown in and described below in connection with FIG. 4.

At 316, process 300 can determine if the updated request status is 1, indicating that the application request has been completed by a second user device. Note that, although the request status is described herein as having a value of 0 if the request has not yet been completed and a value of 1 if the request has been completed, in some embodiments, any other suitable values can be used to indicate the request status.

If, at 316, the request status is 1 ("yes" at 316), process 300 can retrieve data corresponding to the application request from database server 102 at 318. For example, in instances where the application request corresponded to a request to capture an image or video using a camera associated with a second user device, process 300 can retrieve image data corresponding to the captured image or video from database server 102. As another example, in instances where the application request corresponding to a request to capture data from a touchscreen of a second user device, process 300 can retrieve data indicating input on the touchscreen of the second user device. In some embodiments, the data can be transmitted from database server 102 to the first user device via communication network 104, as shown in and described above in connection with FIG. 1. Process 300 can then terminate at block 324.

If, at 316, the request status is not 1 ("no" at 316), process 300 can proceed to block 320 and can determine if a current value of the time out counter (M) exceeds a predetermined threshold T. In some embodiments, T can have any suitable value (e.g., zero, one, two, five, ten, one hundred, and/or any other suitable value). In instances where process 300 does not use a time out counter, block 320 can be omitted.

If, at 320, the value of the time out counter does not exceed the predetermined threshold ("no" at 320), process 300 can increment the value of the time out counter (M) by 1, and can loop back to block 312, where process 300 can wait for N milliseconds before checking an updated request status.

If, at 320, the value of the time out counter exceeds the predetermined threshold ("yes" at 320), process 300 can terminate at block 324.

Figure 4:
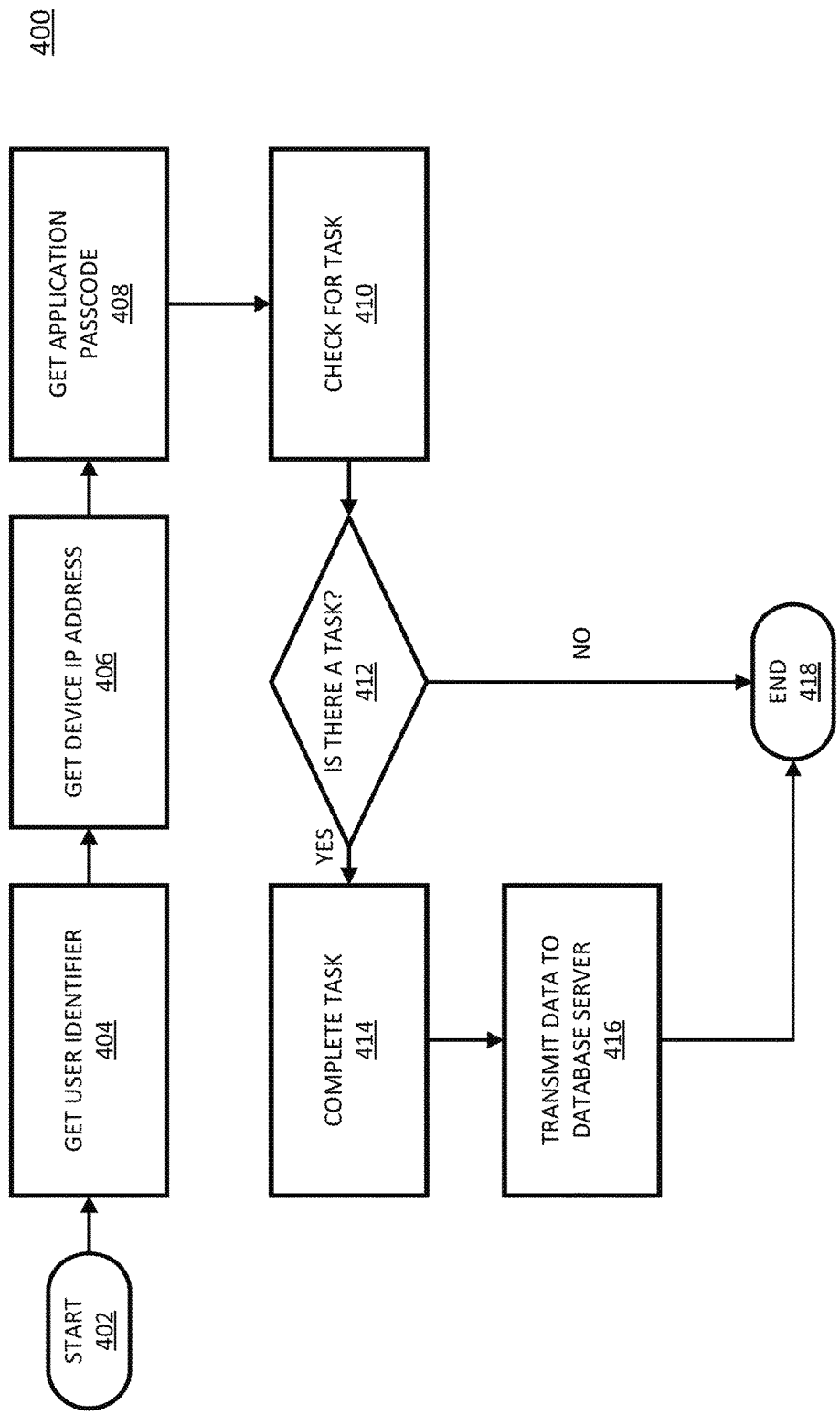
FIG. 4 shows an example of a process for retrieving a task request and transmitting task data in accordance with some embodiments of the disclosed subject matter.

Turning to FIG. 4, an example 400 of a process for retrieving an application request and completing a task corresponding to the application request is shown in accordance with some embodiments of the disclosed subject matter. In some embodiments, blocks of process 400 can be implemented on a user device other than a user device that transmits the application request. For example, as described above in connection with FIG. 3, a first user device, such as user device 106, can transmit the application request, and blocks of process 400 can be performed by a second user device, such as user device 108 and/or 110 (shown in and described above in connection with FIG. 1). Note that, in some embodiments, the first user device and the second user device can be connected to the same network router (e.g., user device 106 and user device 108 connected to network router 112 as shown in FIG. 1) or connected to different network routers (e.g., user device 106 connected to network router 112 and user device 110 connected to network router 114 as shown in FIG. 1).

Process 400 can begin at 402. In some embodiments, process 400 can begin in response to any suitable action being taken on the second user device. For example, in some embodiments, process 400 can begin in response to determining that a particular application has been opened on the second user device, and/or in response to any other suitable action.

Process 400 can retrieve a user identifier at 404. In some embodiments, the user identifier retrieved at block 404 by the second user device can be the same as the user identifier retrieved at block 304 by the first user device. For example, in some embodiments, the user identifier can correspond to a username associated with a user account authenticated on the application executing on the second user device. Note that, in some embodiments, the user identifier can be any type of user identifying information, such as a PIN code, biometric data, and/or any other suitable user identifier.

At 406, process 400 can retrieve the IP address associated with the user device executing process 400. For example, in some embodiments, the IP address can correspond to the network router to which the second user device is connected to, such as network router 112 if the user device user device 108 and network router 114 if the user device is user device 110.

Process 400 can receive a passcode associated with the application at 408. In some embodiments, the passcode can be received in any suitable manner, such as via a keyboard associated with the second user device, a touchscreen associated with the second user device, a microphone associated with the second user device, and/or in any other suitable manner. In some embodiments, the passcode can be one that matches the passcode generated by process 300 at block 308, as described above in connection with FIG. 3. Note that, in some embodiments, process 400 does not need a passcode, and in some such instances, block 408 can be omitted.

At 410, process 400 can query database server 102 to determine if a first user device has transmitted an application task request. In some embodiments, process 400 can transmit a request to database server 102 to identify a pending application task request. For example, in some embodiments, the transmitted request can include the user identifier retrieved at block 404, the IP address retrieved at block 406, and/or the application passcode received at block 408. In some embodiments, any suitable combination of one or more items of information can be included in the request. In some embodiments, the request can be transmitted via the network router the second user device is connected to and communication network 104 to database server 102.

In some embodiments, database server 102 can identify a pending application task request based on the information received from process 400. For example, in some embodiments, database server 102 can identify a pending application task request associated with the same user identifier (e.g., username, and/or any other suitable user identifying data) as included in the information received from process 400. As another example, in some embodiments, data server 102 can identify a pending application task request associated with the same IP address as one included in the information received from process 400 (e.g., in instances where the first user device and the second user device are local to each other). As yet another example, in some embodiments, data server 102 can identify a pending application task request associated with the same passcode included in the information received from process 400.

At 412, process 400 can determine if there is a pending application task request for the second user device to complete. Process 400 can determine if there is a pending application task request based on any suitable information, for example, based on a response to the transmitted query from database server 102.

If, at 412, there is no pending application task request ("no" at 412), process 400 can terminate at block 418.

If, at 412, there is a pending application task request ("yes" at 412), process 400 can complete the task at 414. In some embodiments, process 400 can determine a type of task associated with the application task request, for example, based on information transmitted from database server 102 in response to the query transmitted at block 410. For example, in some embodiments, the information can indicate that an image is to be captured using a camera associated with the second user device executing process 400. As another example, in some embodiments, the information can indicate that data from a touchscreen of the second user device executing process 400 is to be captured. Process 400 can perform the action or task indicated in the application task request by collecting any suitable data. Note that, in instances where the action or task requires particular hardware associated with the second user device such as a camera, a touchscreen, a microphone, and/or any other suitable hardware, process 400 can cause the hardware to be automatically initialized or interfaced with in any suitable manner.

At 416, process 400 can transmit the collected data to database server 102. The data can be transmitted in any suitable manner, for example, via communication network 104. Additionally, in some embodiments, process 400 can transmit instructions to database server 102 to set a request status associated with the application task request to 1 (or any other suitable value) to indicate that the task has been completed by the second user device.

It should be understood that at least some of the above described blocks of the processes of FIGS. 3 and 4 can be executed or performed in any order or sequence not limited to the order and sequence shown in and described in the figure. Also, some of the above blocks of the processes of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for pairing devices to complete a task using an application request are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for pairing devices for completing tasks, the method comprising:
    identifying, at a first user device, an indication of a task to be completed;
    generating a passcode corresponding to the task to be completed and required to be entered by a user of a second user device;
    transmitting, by the first user device to a server: first information indicating the task to be completed second information identifying the first user device; a request identifier; and the passcode corresponding to the task to be completed and required to be entered by the user of the second user device, wherein the request identifier is different from the passcode;
    receiving, by the second user device from the user of the second user device, the passcode;
    determining, by the second user device, whether there is a pending task request corresponding to the passcode;
    determining whether a first predetermined duration of time has elapsed;
    in response to determining that the first predetermined duration of time has elapsed, transmitting, from the first user device to the server, a first request to determine whether the task has been completed by the second user device; and
    in response to receiving, from the server, an indication that the task has been completed by the second user device, retrieving data corresponding to the task from the server.

2. The method of claim 1, further comprising generating an alphanumeric identifier that indicates the task to be completed.

3. The method of claim 1, further comprising transmitting, by the first user device to the server, third information indicating an Internet Protocol (IP) address associated with the first user device.

4. The method of claim 1, wherein the second user device is local to the first user device.

5. The method of claim 1, further comprising:
    in response to receiving, from the server, an indication that the task has not been completed by the second user device, determining whether a second predetermined duration of time has elapsed; and
    in response to determining that the second predetermined duration of time has elapsed, transmitting, from the first user device to the server, a second request to determine whether the task has been completed by the second user device.

6. The method of claim 1, wherein the retrieved data includes image data captured by a camera associated with the second user device.

* * * * *